United States Patent [19]

Maiocco

[11] 4,414,830
[45] Nov. 15, 1983

[54] LOCKING DEVICE FOR MOTOR VEHICLES

[75] Inventor: Guiseppe A. Maiocco, Druento, Italy

[73] Assignee: Champion Spark Plug Italiana S.p.A., Druento, Italy

[21] Appl. No.: 323,065

[22] Filed: Nov. 19, 1981

[30] Foreign Application Priority Data

Nov. 28, 1980 [IT] Italy ................................ 68820 A/80

[51] Int. Cl.³ ............................................ B60R 25/02
[52] U.S. Cl. ........................................ 70/252; 70/186
[58] Field of Search ................. 70/252, 186, 182–185; 200/44

[56] References Cited

U.S. PATENT DOCUMENTS

| | | | |
|---|---|---|---|
| 3,527,071 | 9/1970 | Warnod | 70/252 |
| 3,840,714 | 10/1974 | Arman | 200/44 |
| 3,859,828 | 1/1975 | Ibuke | 70/252 |
| 3,914,967 | 10/1975 | Arman | 70/252 |
| 4,031,728 | 6/1977 | Eichenauer | 70/252 |
| 4,040,007 | 8/1977 | Kuroki | 340/52 |
| 4,328,688 | 5/1982 | Maiocco | 70/252 |

Primary Examiner—Robert L. Wolfe
Attorney, Agent, or Firm—John C. Purdue

[57] ABSTRACT

An improved key-operated steering shaft locking device for a motor vehicle is disclosed. The device comprises a rotatable lock cylinder, a spring, and a latch movable between steering shaft locking and unlocking positions, the latch being operatively associated with the cylinder so that rotation of the latter causes axial movement of the former perpendicular to the axis of rotation of the cylinder from the locked to the unlocked position; the latch is also operatively associated so that the spring urges the latch toward the locked position. The improved device further comprises means including a rocker arm pinned for rotational movement between a first position wherein a portion of the arm extends into the key slot of the cylinder and the means is ineffective to lock the latch in the position where the shaft is unlocked, and a second position wherein the arm does not extend into the key slot and the means is effective to lock the latch in the position where the shaft is unlocked.

5 Claims, 23 Drawing Figures

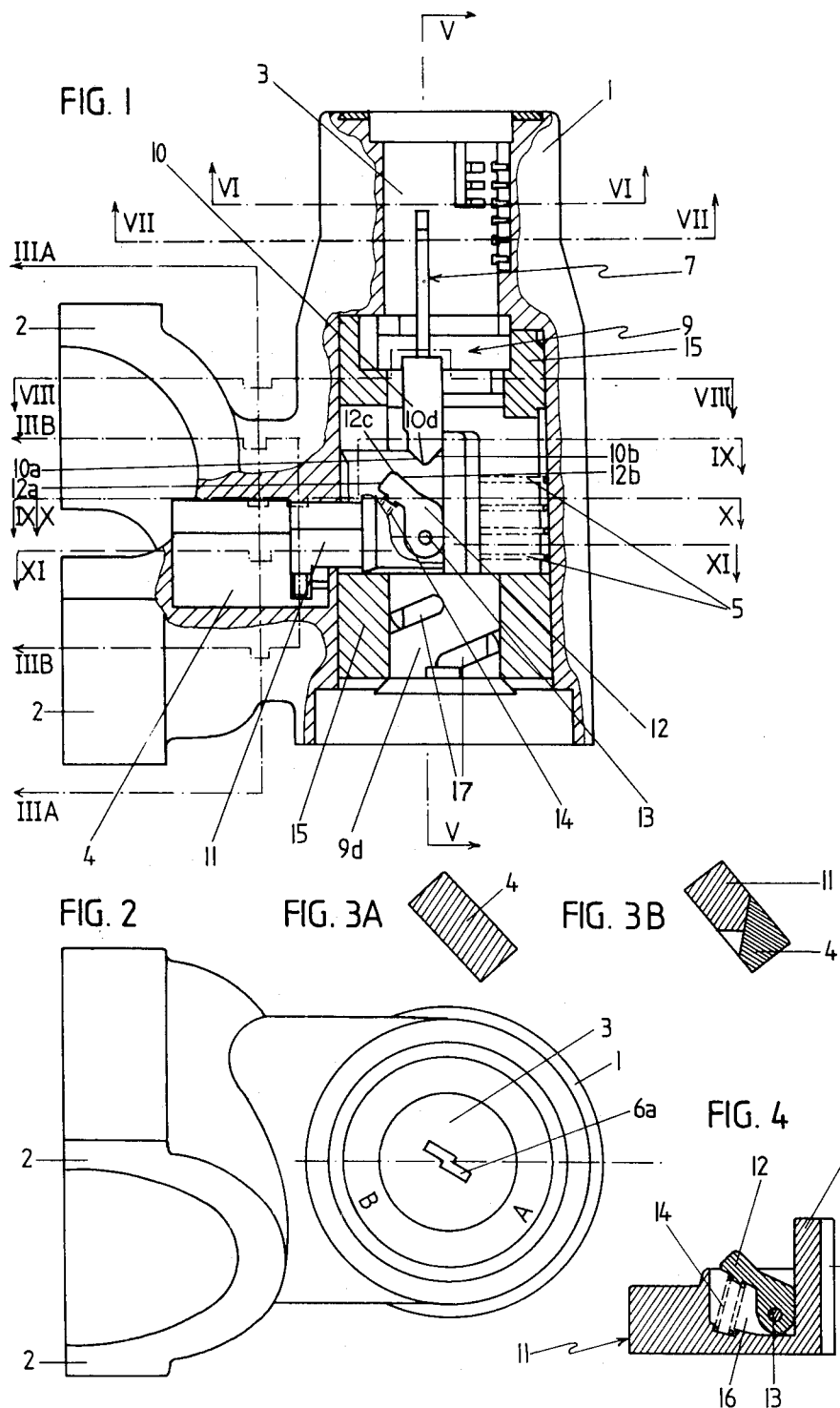

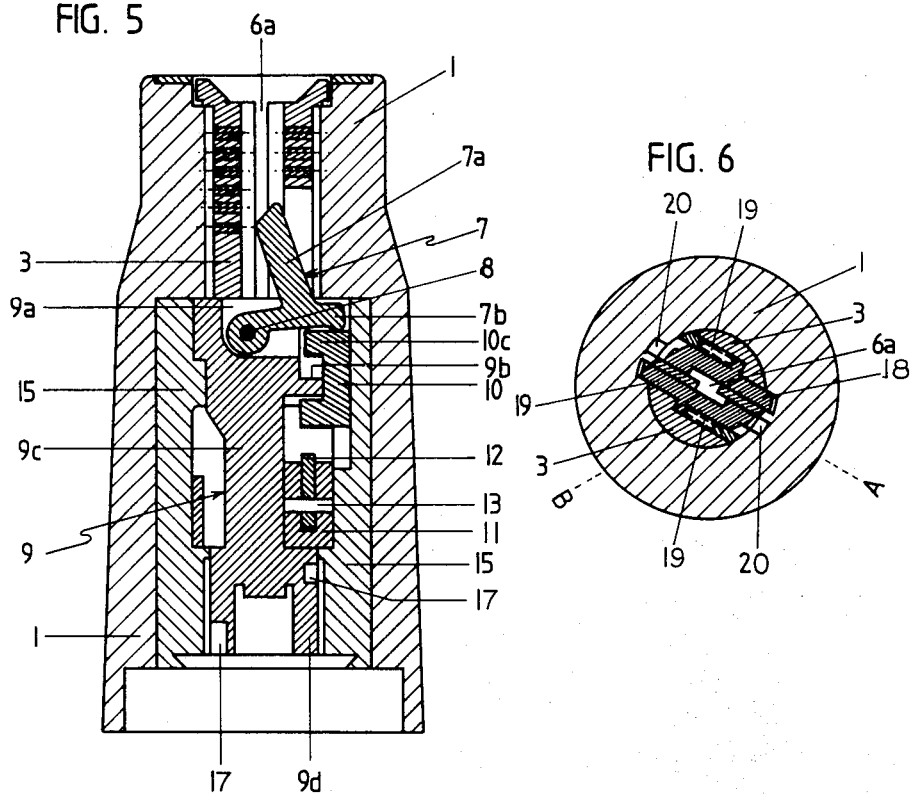

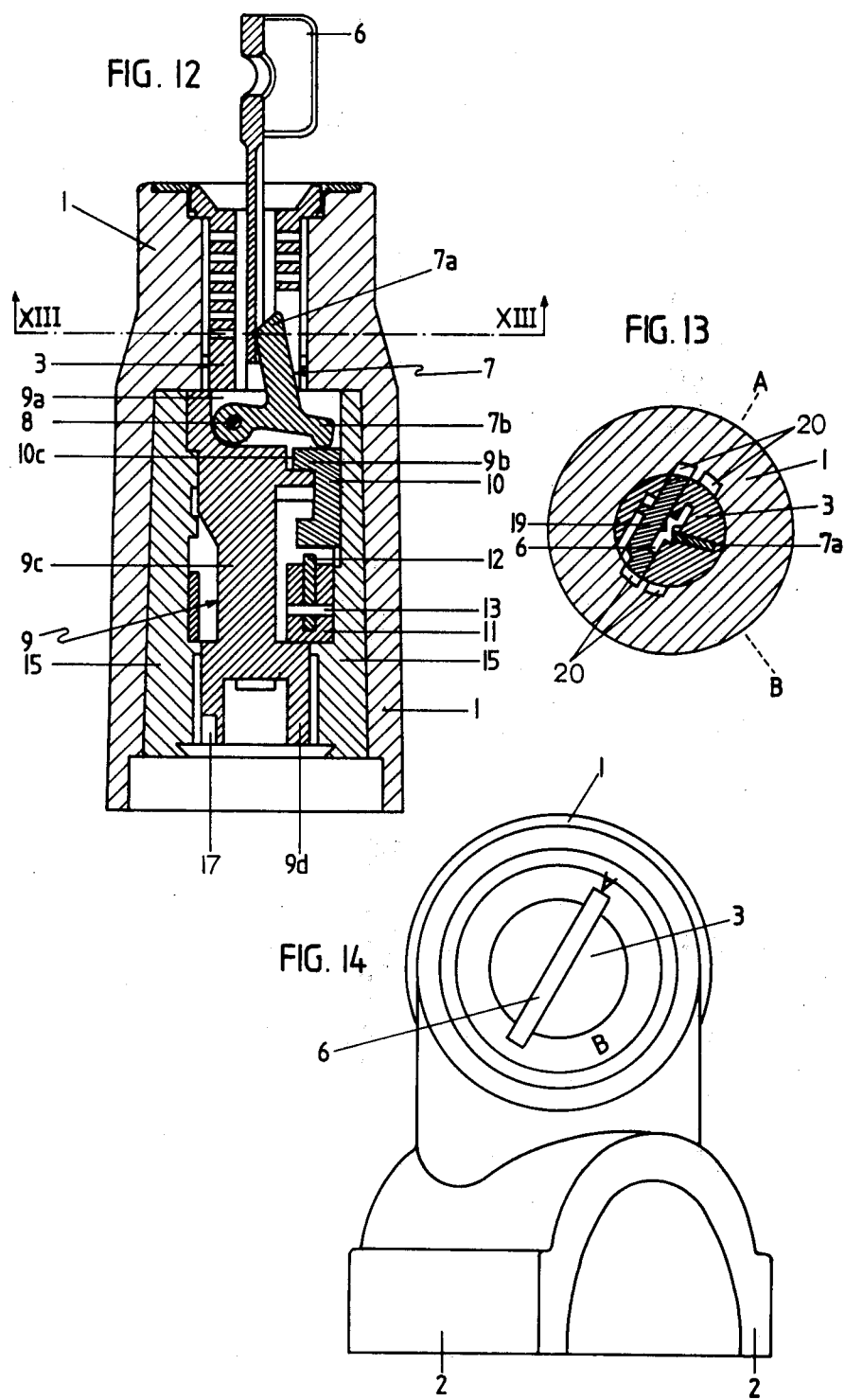

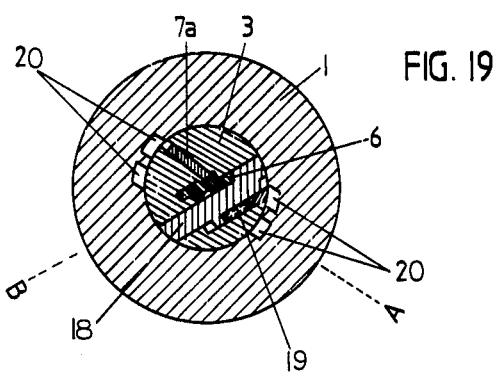
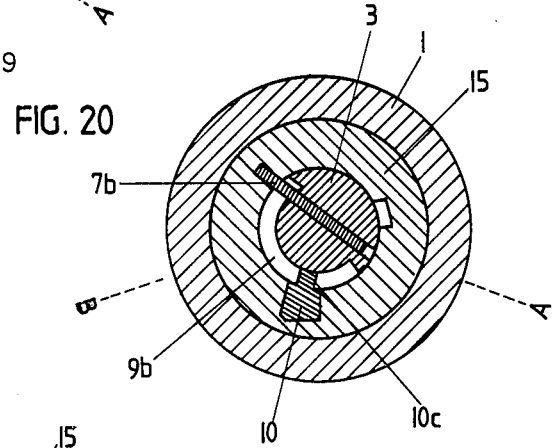
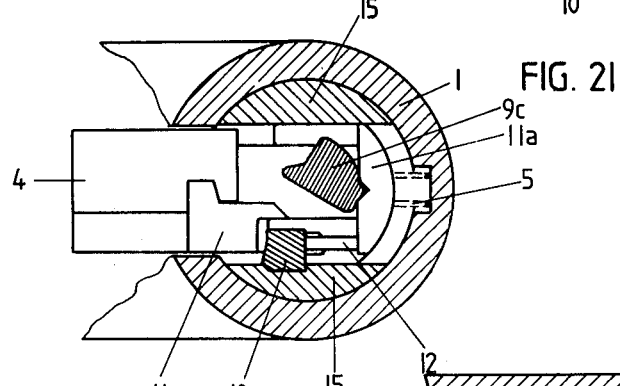
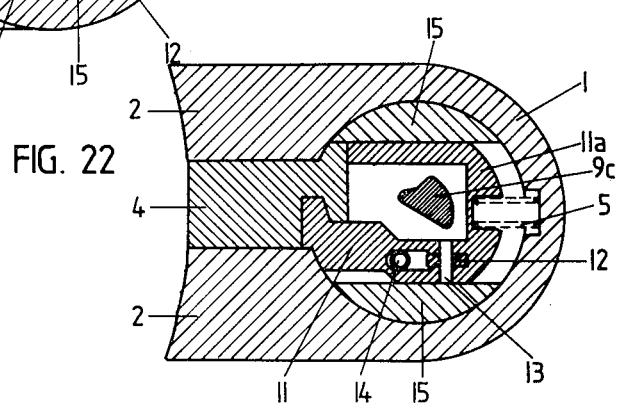

LOCKING DEVICE FOR MOTOR VEHICLES

BACKGROUND OF THE INVENTION

1. Field of the Invention

The present invention relates to key-operated steering shaft locking devices for motor vehicles. More particularly, the invention relates to such a device comprising a key-operated rotatable cylinder and a latch, the latch being operable to move perpendicularly to the axis of rotation of the cylinder to lock the steering shaft against rotation.

2. Description of the Prior Art

Most known key-operated steering shaft locking devices are provided with a locking bolt, or latch, which is operable to lock the shaft by moving parallel to the longitudinal axis of a rotatable lock cylinder operatively associated therewith and activated by the key. The longitudinal movement of the latch can cause such devices to be difficult to assemble, and can result in increased wear of moving parts and diminished reliability in service. Indeed, within the housings of typical locking devices the movable locking and unlocking mechanisms are usually placed in a side-by-side configuration, parallel to relatively complex mechanisms which enable, for example, insertion of the ignition key into the cylinder, rotation of the cylinder with the key therein, and withdrawal of the key in certain positions of rotation of the cylinder and not in others. Since the practical reasons for which the assembled device are limited by the size of its housing, manufacturers often are forced to use very precise dimensional tolerances for component parts, thus increasing the risk of relatively fast wear and diminished reliability.

Furthermore, in steering shaft locking devices of the type described in the preceding paragraph, the number of parts necessary for proper operation is comparatively high, and, since all of these parts must be integrated into a limited space, assembly difficulties can be significant. The assembly of such devices is, accordingly, often a slow operation, human errors being commonplace. An example of such a prior art steering locking device is disclosed in French Pat. No. 2,330,569.

SUMMARY OF THE INVENTION

The present invention provides an improvement in a locking device for the steering shaft of a motor vehicle wherein a latch, movable between a position wherein it is operable to lock the shaft and a position wherein the shaft is unlocked, moves perpendicularly to the axis of rotation of a key-operated lock cylinder, and is operatively associated with at least one spring. Such a locking device has at least the following advantages.

(1) The locking and unlocking mechanisms of the latch are separated almost completely from the mechanisms which are operatively associated with the ignition key;

(2) Difficulties in designing, manufacturing and assembling together the aforementioned mechanisms, within a limited space, virtually are eliminated;

(3) The component mechanisms of such a device can be designed and constructed more sturdily since extremely precise dimensional tolerances therefor are unnecessary, resulting in enhanced reliability of the device in service.

According to the improvement of the instant invention, a key-operated steering shaft locking device comprises a mechanism operatively associated with a latch for locking the steering shaft when the key is not in its slot in the lock cylinder. The mechanism can comprise a rocker arm located between the cylinder and the latch, and capable of projecting into a portion of the key-slot substantially perpendicularly to the largest dimension of the transverse cross-section of the slot. In a further embodiment, the spring is operable to move the rocker arm toward the position where it projects into the key-slot, and is further operable to urge the latch toward a position wherein the steering shaft is locked while the rocker arm moves toward its projecting position.

Accordingly, it is an object of the present invention to provide an improved, key-operated steering shaft locking device for a motor vehicle.

It is a further object of the invention to provide such an improved steering shaft locking device which is operable to lock the shaft upon removal and insertion of the key from its slot in a rotatable lock cylinder, and inoperable to lock the shaft when the key is rotated therein, and wherein the axis of rotation of the key in the cylinder is perpendicular to the axis of displacement of a latch for locking the shaft.

Other objects and advantages of the invention will be apparent from the description which follows, reference being made to the accompanying drawings.

BRIEF DESCRIPTION OF THE DRAWINGS

FIG. 1 is a schematic, partial sectional view of a preferred embodiment of a key-operated steering shaft locking device according to the invention; the device is shown without the key therein.

FIG. 2 is a top plan view of the device shown in FIG. 1.

FIGS. 3A and 3B are partial sectional views, taken along lines IIIA—IIIA and IIIB—IIIB of FIG. 1, respectively, and showing details of construction of a latch and an operatively associated mechanism for locking the steering shaft.

FIG. 4 is a partial sectional view, taken along line IV—IV of FIG. 10, and showing internal details of the device of FIG. 1.

FIG. 5 is a partially-schematic sectional view, taken along the line V—V of FIG. 1.

FIG. 6 is a sectional view, taken along the line VI—VI of FIG. 1.

FIG. 7 is a sectional view, taken along the line VII—VII of FIG. 1.

FIG. 8 is a partial sectional view, taken along the line VIII—VIII of FIG. 1.

FIG. 12 is a partially-schematic sectional view similar to FIG. 5, but showing the locking device of the invention in its STOP position with the key therein.

FIG. 13 is a sectional view, taken along the line XIII—XIII of FIG. 12.

FIG. 14 is a top plan view similar to FIG. 2, but showing the corresponding position of the key when the device is in its STOP position, as in FIG. 12.

FIG. 19 is a sectional view, taken along the line XIX—XIX of FIG. 17.

FIG. 20 is a sectional view, taken along the XX—XX of FIG. 17.

FIG. 21 is a fragmentary sectional view, taken along the line XXI—XXI of FIG. 17.

FIG. 22 is a sectional view, taken along the line XXII—XXII of FIG. 17.

DETAILED DESCRIPTION OF THE INVENTION

Figure 9:
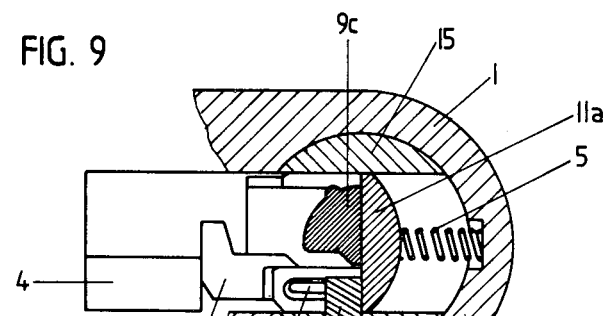
FIG. 9 is a fragmentary sectional view, taken along the line IX—IX of FIG. 1.
Figure 10:
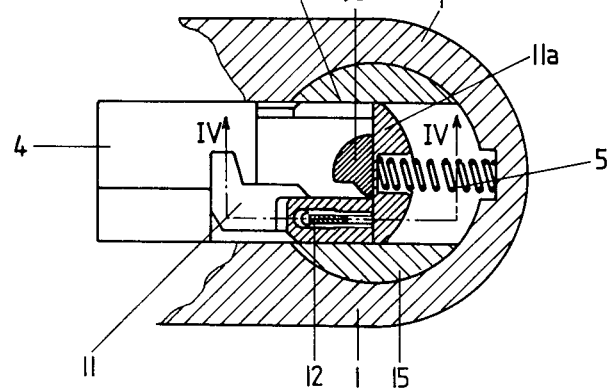
FIG. 10 is a fragmentary sectional view, taken along the line X—X of FIG. 1.
Figure 11:
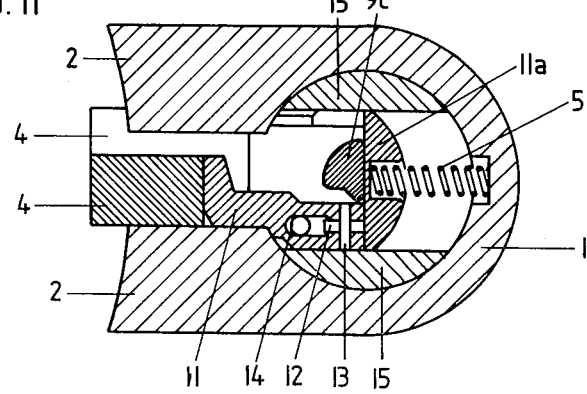
FIG. 11 is a sectional view, taken along the line XI—XI of FIG. 1.

Three operating conditions for components of a steering shaft locking device according to the instant invention are considered in the following discussion. In most known devices, a single key is operable to lock and unlock both the ignition system and the steering shaft of the vehicle; a device according to the invention can be so operable, and can have four positions corresponding to STOP, ON, RUN and START. Since the present invention relates solely to a device for locking and unlocking the steering shaft of a motor vehicle, and not to apparatus for operating the ignition or another electrical system, only the STOP and RUN positions of the key and the corresponding operative conditions of the device will be discussed herein. The three operating conditions of a locking device according to the present invention, as illustrated in the drawings and described in connection therewith, are:

(1) The steering shaft of the vehicle is locked and the key is not in the device. FIGS. 1 through 11 show the device in this condition.

(2) The steering shaft of the vehicle is locked and the key is in the device, in the STOP position. FIGS. 12 through 16 show the device in this condition.

(3) The steering shaft of the vehicle is unlocked and the key is in the device in the RUN position, for example after having been rotated thereto from the STOP position. FIGS. 17 through 22 show the device in this condition.

Referring to FIG. 2, a slot 6a for an ignition key (not shown in this Figure) of a motor vehicle is shown in the "A" position, corresponding to the STOP condition of the locking device, described above; position "B" of the slot 6a corresponds to the RUN condition, also described above. The position of the slot 6a, as illustrated and described herein, is identical in FIGS. 1–11 (STOP), and also is identical in FIGS. 12–16 (STOP). In the STOP position shown in FIGS. 1–11, the key is not in the slot 6a and an operatively associated locking bolt or latch, for example as indicated at 4 of FIG. 1, is in a position to lock the steering shaft (not shown) of an associated vehicle against rotation. As shown in FIGS. 12–16, when the key is in the slot 6a, and the latter is the "A" position, the latch 4 is still in a position to lock the steering shaft, and the locking device is in its STOP condition. However, when the slot 6a with a key therein is in its "B" position, the latch 4 is in a position wherein the steering shaft is unlocked, corresponding to the RUN condition of the locking device.

Referring to FIG. 1, the preferred embodiment of a locking device according to the invention comprises an external housing 1, a collar 2 for securing the housing 1 to an associated steering shaft (not shown) of a motor vehicle, a rotatable lock cylinder 3, a first rocker arm 7, a first sliding member 10, a second rocker arm 12, a second sliding member 11 operatively associated with the latch 4, and two springs 5 which urge the second sliding member 11 and the latch 4 to the left toward locking engagement with the steering shaft. During operation of the device shown, locking of the steering shaft is accomplished when the latch 4 is received in a corresponding recess (not shown) in the shaft.

Referring to FIG. 5, the first rocker arm 7 is generally T-shaped and rotates about a pin 8. When, as shown, there is not a key in the key-slot 6a, a leg 7a of the arm 7 projects laterally into the slot 6a substantially perpendicularly to the largest dimension of the traverse cross-section thereof, having been urged thereinto by the springs 5, the second rocker arm 12, the second sliding member 11 and the first sliding member 10. The relative positions of the rotatable cylinder 3, the first and second rocker arms 7 and 12, the sliding members 10 and 11, and the latch 4 are, when the extension 7a projects into the slot 6a, those shown in FIG. 1.

Referring now to FIG. 12, operation of the locking device according to the invention occurs when the key 6 is inserted into the slot 6a. The extension 7a of the rocker arm 7 is moved by the key 6 laterally out of the slot 6a, causing rotation of the rocker arm 7 so that a second extension 7b urges the first axially-sliding member 10 toward the second rocker arm 12. The relative positions of the ket 6, when in the slot 6a, of the moving parts 3, 7, 10, 11 and 12 and of the latch 4 of the locking device are those shown in FIGS. 12 and 15 where the key 6 is in its "A" position (corresponding to STOP, as also shown in FIGS. 14 and 16); correspondingly, the latch 4 is in locking engagement with the steering shaft (not shown) of the vehicle.

Figure 15:
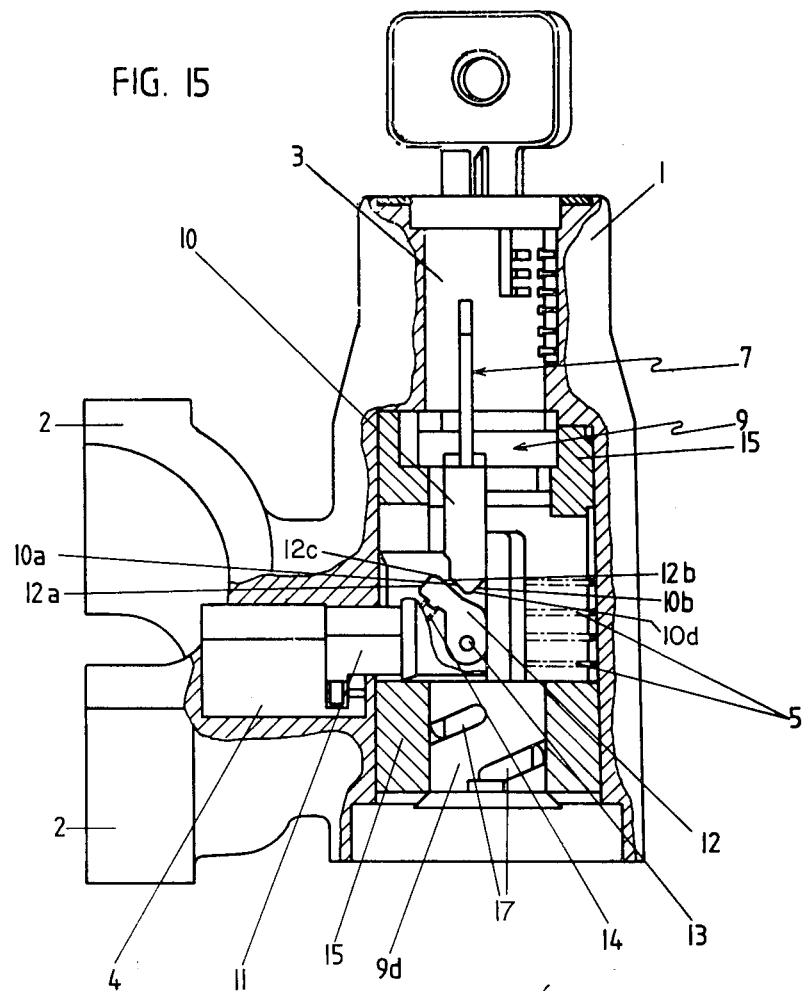
FIG. 15 is a schematic, partial sectional view similar to FIG. 1, but showing the locking device of the invention in its STOP position with the key therein, as in FIG. 12.

Referring now to FIGS. 1 and 15, the first sliding member 10 has two inclined surfaces 10a and 10b, with a bottom edge 10d therebetween; the second rocker arm 12 has two inclined surfaces 12a and 12b, with a top edge 12c therebetween. Comparing FIGS. 1 and 15, it is apparent that when the key 6 is not in the device (FIG. 1), the bottom edge 10d of the member 10 is higher than the top edge 12c of the arm 12; the bottom edge 10d of the member 10 also is displaced laterally with respect to the top edge 12c. However, when the key 6 is in the slot 6a and the device (FIG. 15) is in the STOP position (designated A in FIG. 16), the bottom edge 10d of the member 10 is positioned at a lower level than the top edge 12c of the arm 12. A spring 14 urges the arm 12 (FIG. 15) to rotate about a pin 13 toward the member 10. The pin 13 is secured to the second axially-sliding member 11.

Figure 16:
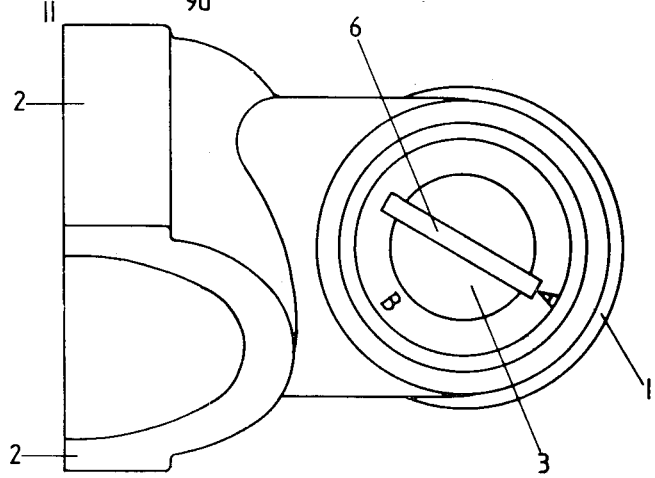
FIG. 16 is a top plan view similar to FIG. 14.
Figure 17:
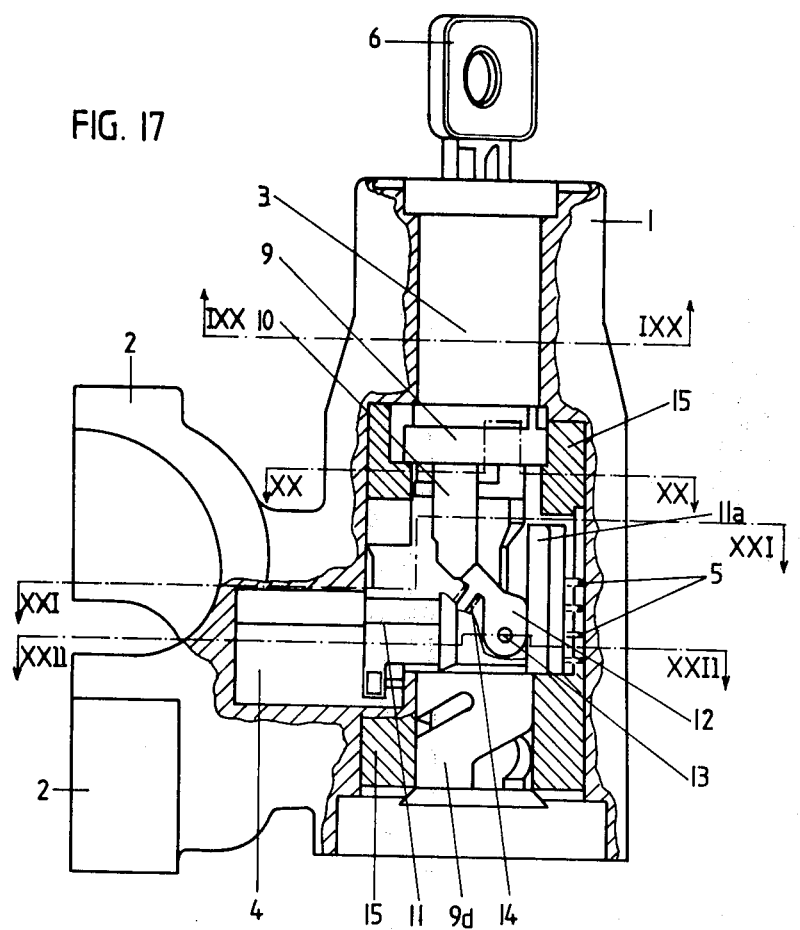
FIG. 17 is a schematic, partial sectional view similar to FIG. 15, but showing the ignition key in the locking device, and the device in its RUN position.
Figure 18:
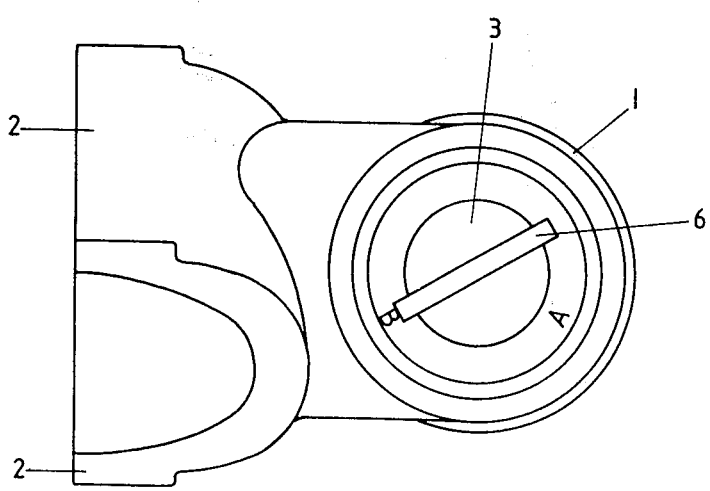
FIG. 18 is a top plan view similar to FIG. 14, but showing the ignition key in the RUN position, as in FIG. 17.

Referring to FIGS. 17 and 18, the locking device is shown with the key 6 in the RUN position (designated B), a position to which it can be rotated from the STOP position (designated A, FIGS. 15 and 16). The second sliding member 11 has been moved laterally (FIGS. 17 and 18) to retract the operatively-associated latch 4. This lateral movement is secured by a cam 9c and springs 5 which urge the member 11 toward contact with the cam 9c so that the member 11 follows the surface contours thereof (FIGS. 9 and 21). The latch 4 is retracted and the steering shaft (not shown) of the vehicle is unlocked by rotation of the cam 9c (FIG. 21)

which is a part of an extension 9 (FIG. 17) of the cylinder 3. The cam 9c acts upon a vertical portion 11a of the second sliding member 11. During axial movement of the member 11, the rocker arm 12 passes under the first sliding member 10, and the former is driven downwardly against the action of the spring 14. After the member 11 has completed its axial movement, the spring 14 urges the arm 12 upwardly, positioning it as shown in FIG. 17 so that its inclined surface 12a (FIG. 15) abuts the inclined surface 10b of the member 10, thereby preventing movement of the member 11 and, consequently, of the latch 4 to the left; therefore, the steering shaft remains unlocked (FIGS. 17 and 18). The latch 4 is movable from this position only to the left (FIG. 17) to a position in which the steering shaft is locked. Such movement occurs if the key 6 is removed from the device. However, so long as the presence of the key 6 in the slot 6a (FIGS. 12 and 19) prevents the arm 7 from entering the latter, the member 10 cannot move upwardly to release the arm 12 and the latch 4 remains in a position where the steering shaft is unlocked. When the key 6 is removed from the device, the springs 5, acting through the member 11 and the arm 12, urge the member 10 upwardly, and enabling the member 11 and the latch 4 to move to the left into a position where the latter locks the steering shaft. The upward movement of the first sliding member 10 forces the extension 7a of the rocker arm 7 into the slot 6a (FIG. 5).

In FIGS. 1, 15 and 17 all stationary parts are shown in section, while all movable parts (whether their movement is rotational or axial) are shown in elevation. In the same figures, and, for example, also in FIGS. 3B, 9, 10, 11, 21 and 22, the latch 4 is shown operatively associated with the member 11 so that, when the cam 9c drives the latter, axial movement is imparted to the latch 4. Such association of the parts 4 and 11 facilitates assembly, during manufacture of a locking device according to the invention, of these and the various other elements of the device within the housing 1.

The member 11 is shown in section in FIG. 4. The member 11 has a recess 16 wherein the rocker arm 12 is positioned for rotational movement about the pin 13. As previously described, the cam 9c (see, for example, FIGS. 9 and 21) acts upon a vertical portion 11a of the sliding member 11 when the key 6 is turned from the STOP (A) position toward the RUN (B) position.

The extension 9 (FIGS. 1, 5, 12, and 15) of the cylinder 3 rotates therewith when the key 6 is rotated in its slot 6a. An upper portion of the extension 9 has a recess 9a (FIGS. 5 and 12) wherein the rocker arm 7 is positioned for rotational movement about the pin 8. The extension 9 also has an annular groove 9b (FIGS. 5, 8, 12 and 20), in which a projection 10c of the member 10, when in its lower position (FIG. 12) is received during relative rotation between the extension 9 and the member 10 (FIGS. 5, 12 and 20).

A center portion of the extension 9 of the cylinder 3 functions as the cam 9c (FIGS. 9, 10, 11, 21 and 22), acting upon the vertical portion 11a (FIGS. 17, 21 and 22) of the member 11 to cause axial displacement thereof, thereby transforming rotational movement imparted to the cylinder 3 by turning of the key 6 therein, and the resultant rotational movement of the extension 9 of the cylinder 3, into the axially-sliding movement of the member 11. The displacement of the member 11 causes corresponding displacement of the latch 4 from a position where it locks the steering shaft of the vehicle to a position where the shaft is unlocked; during such movement the member 11 also compresses the springs 5, so that its surface 11a is urged into contact with the cam 9c.

The lower portion of the extension 9 of the cylinder 3 also includes an extension 9d (FIGS. 1, 5, 12, 15 and 17) which has a helical groove 17 therein. The groove 17 can be associated with electrical functions, for example operation of the ignition system of the engine of the vehicle, which also can be performed by the locking device. The extension 9 is disposed within the bore of a substantially tubular sleeve 15 (FIGS. 1, 5, 8–12, 15, 17, 20–22) which is shaped as required to accommodate working elements of the locking device.

In the preferred embodiment of the locking device of the invention illustrated in the drawings, the rotatable cylinder 3 is shown as being of largely conventional construction, including locking tumblers 18 (FIGS. 6, 7, 13 and 19) appropriately situated to enable locking or unlocking of the device with the proper key. However, it will be appreciated that the cylinder 3 could include, rather than the tumblers 18, pistons, plates or other conventional lock parts. In the embodiment shown, when the key 6 is not in its slot 6a (e.g., in FIGS. 6 and 7), the tumblers 18, urged by springs 19, project partially into recesses in the housing 1 of the locking device, thereby preventing rotation of the cylinder 3. However, when the key 6 is in its slot 6a (e.g. as shown in FIGS. 13 and 19), the teeth thereof push the tumblers 18 against the springs 19 out of the recesses 20, enabling rotation of the cylinder 3.

One embodiment of the invention having been described, it is evident that various modifications can be made to the specific device disclosed without departing from the spirit and scope of the invention as defined in the following claims.

What I claim is:

1. In a key-operated steering shaft locking device for a motor vehicle, the device comprising a rotatable lock cylinder having a key slot, a spring and a latch movable from a position wherein an associated steering shaft is locked to a position wherein the shaft is unlocked, the latch being operatively associated with the cylinder so that rotation of the latter causes axial movement of the former perpendicular to the axis of rotation of the cylinder from the locked to the unlocked position and also being operatively associated so that the spring urges the latch toward the locked position, the improvement wherein the locking device further comprises means including a rocker arm pinned for rotational movement between a first position wherein a portion of said arm extends into the key slot of the cylinder and said means is ineffective to lock the latch in the position where the shaft is unlocked and a second position wherein said arm does not extend into the key slot and said means is effective to lock the latch in the position where the shaft is unlocked, and means operatively associated with said rocker arm and the spring so that, when the latch is locked in the position where the shaft is unlocked, the spring urges said rocker arm toward the first position, whereby, a key inserted in the key slot moves said rocker arm to the second position and said last-named means urges said rocker arm toward the first position when the latch is locked in the position where the shaft is unlocked.

2. The improvement claimed in claim 1, wherein the spring is operatively associated to urge the latch toward the lock position during rotational movement of said rocker arm toward the first position.

3. The improvement claimed in claim 2, wherein said first-named means further includes a second rocker arm pinned for rotational movement between a first position in which it is ineffective to lock the latch in the position wherein the steering shaft is unlocked, and a second position in which it is operable to lock the latch in the position wherein the shaft is unlocked, and a sliding member operatively associated with the lock cylinder and with said second rocker arm and axially movable in a plane perpendicular to the axis of rotation of the cylinder between first and second position, so that rotation of the cylinder causes movement of said sliding member to the first position wherein said second rocker arm is in locking engagement with said last-named means to lock the latch in the position where the shaft is unlocked, and withdrawal of the key from the key slot causes movement of said sliding member to the first position wherein said second rocker arm is not in locking engagement with said last-named means to lock the latch in the position where the shaft is unlocked.

4. The improvement claimed in claim 3, wherein the lock cylinder is rotatable between first and second positions, the first position being one in which the latch is in the position wherein the steering shaft is locked and the second position being one in which the latch is withdrawn from the locked position and moved to the position wherein the shaft is unlocked, said second position of the cylinder being additionally one in which said second rocker arm is moved into locking engagement with said last-named means to lock the latch in the position where the shaft is unlocked.

5. The improvement claimed in claim 4, wherein said first-named means further includes a spring operatively associated to urge said second rocker arm toward the second position.

* * * * *